(12) United States Patent
Fisher et al.

(10) Patent No.: US 7,587,141 B2
(45) Date of Patent: Sep. 8, 2009

(54) COMMUNICATION TRANSCEIVER ARCHITECTURE

(75) Inventors: Donald Fisher, Greene, OH (US); Michael Gangl, Springboro, OH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 647 days.

(21) Appl. No.: 11/194,740

(22) Filed: Aug. 2, 2005

(65) Prior Publication Data
US 2007/0031150 A1    Feb. 8, 2007

(51) Int. Cl.
*H04B 10/00*    (2006.01)
(52) U.S. Cl. ...................................... 398/128
(58) Field of Classification Search .......... 398/118–131
See application file for complete search history.

(56) References Cited

U.S. PATENT DOCUMENTS

| | | | | |
|---|---|---|---|---|
| 5,465,170 | A | * | 11/1995 | Arimoto .................... 398/129 |
| 5,517,016 | A | * | 5/1996 | Lesh et al. ............... 250/201.1 |
| 6,347,001 | B1 | * | 2/2002 | Arnold et al. ............... 398/122 |
| 6,384,944 | B1 | | 5/2002 | Takayama et al. |
| 6,327,063 | B1 | | 1/2007 | Rockwell |
| 7,346,281 | B2 | * | 3/2008 | Wilcken et al. ............. 398/122 |
| 2003/0035169 | A1 | | 2/2003 | Byers et al. |

* cited by examiner

*Primary Examiner*—Quan-Zhen Wang
(74) *Attorney, Agent, or Firm*—Edell, Shapiro & Finnan, LLC (57) ABSTRACT

A free-space communication transceiver includes a telescope for transmitting and receiving laser beams, a tunable laser transmitter for generating a transmit laser beam modulated with data, a tunable optical receiver for processing a receive laser beam received from the telescope to recover data, and a tunable beamsplitter that directs the transmit laser beam to the telescope and directs the receive laser beam from the telescope to the optical receiver. Between the telescope and beamsplitter, the transmit and receive laser beams travel along a common optical axis as collinear collimated free-space beams. The transmit and receive laser beams operate at different wavelengths that can be interchanged, thereby support full-duplex operation. The beamsplitter employs a tunable etalon filter whose wavelength-dependent transmission characteristics are adjusted according to the transmit and receive wavelengths. Optionally, RF signals can additionally be couple to the common optical axis and transmitted and received by the telescope.

26 Claims, 6 Drawing Sheets

COMMUNICATION TRANSCEIVER ARCHITECTURE

BACKGROUND OF THE INVENTION

1. Field of the Invention

The present invention relates to a communication transceiver architecture and, more particularly, to a full-duplex free-space laser communication system.

2. Description of the Related Art

Free space laser communication systems offer the potential to transmit data at very high data rates over long distances. Due to the spatial coherence of laser sources, long range transmission is possible at modest power levels compared to RF systems. Further, the modulation frequencies of lasers allow for gigahertz bandwidths and are limited only by the current state of electro-optic components.

However, operating conditions such as atmospheric turbulence and cloud obscurations affect the performance of free space laser communication systems. Consequently, communication systems relying solely on laser signals at optical wavelengths may suffer periods in which communication is severely diminished or entirely precluded.

Moreover, adapting free space laser communication systems to moving platform environments such as airborne, space, and ground vehicles presents difficult technical challenges such as developing accurate angular pointing and tracking and achieving greater component ruggedness. Current laser communication systems are bulky, fragile, and not compatible with moving platform environments. Particularly with airborne platforms, where movement of aircraft can be unpredictable, it is critical that the pointing and tracking scheme provide accurate guidance for directing the data laser beams. However, lasers for pointing and tracking may be difficult to align to the data optical axis, and the transmitter and receiver configuration may be susceptible to even small misalignments. Also, many proposed systems employ laser wavelengths that are not eye-safe.

Further, typical free-space laser communication schemes are not suitable for developing a network-like communication capability among a number of moving platforms. For example, transmitters and receivers of proposed laser communication systems commonly employ static wavelengths and polarizations, thereby limiting the flexibility of such systems. Consequently, full-duplex operation is generally not possible with such schemes, particularly in a network context. Accordingly, practical free space laser communication systems have yet to be developed successfully for use in airborne and space environments.

SUMMARY OF THE INVENTION

According to an exemplary embodiment of the present invention, a free-space communication transceiver includes: a telescope for transmitting and receiving laser beams; a data laser transmitter module for generating a transmit laser beam modulated with data; an optical receiver module for processing a receive laser beam to recover data; and a beamsplitter that directs the transmit laser beam from the data laser transmitter module to the telescope and directs the receive laser beam from the telescope to the optical receiver module. Between the beamsplitter and the telescope, the transmit and receive laser beams travel along a common optical axis as collinear, collimated free-space beams, which reduces the system's sensitivity to slight misalignments and environmental factors such as vibration and temperature changes. Preferably, the transmit and receive laser beams are randomly polarized. Eye-safe wavelengths can be use for all transmitted laser beams in the system.

The data laser transmitter module is tunable such that the transmit wavelength of the transmit laser beam is selectable between at least first and second wavelengths. Likewise, the optical receiver module is tunable such that the receive wavelength of the receive laser beam is selectable between at least the first and second wavelengths. At any given time, the transmit and receive wavelengths are different. For example, in a first mode, the transmit wavelength is the first wavelength and the receive wavelength is the second wavelength and, in a second mode, the transmit wavelength is the second wavelength and the receive wavelength is the first wavelength. In this manner, two wavelengths can be used as two transmit/receive wavelength pairs, which permit a network of transceiver terminals to operate in a full-duplex communication mode. Additional wavelength pairs can be employed by appropriate tuning of the laser transmitter and receiver to other wavelengths.

The beamsplitter is preferably tunable such that, in one mode, the beamsplitter is substantially transmissive at one of the first and second wavelengths and substantially reflective at the other of the first and second wavelengths and, in another mode, substantially reflective at the one of the first and second-wavelengths and substantially transmissive at the other of the first and second wavelengths. This tuning capability greatly simplifies the transceiver architecture, since only a single, stationary fiber optic collimator is required to couple transmit beams of any wavelength to the common optical axis, and only a single, stationary fiber optic collimator is required to couple any receive laser beams to the optical receiver. In effect, the beamsplitter is tuned in coordination with the transmitter and receiver to direct beams of certain wavelengths to the proper destination. The beamsplitter can be, for example, a tunable etalon filter that is coupled to the transmit laser path along a first optical axis and coupled to the receive laser path along a second optical axis, such that the etalon filter is substantially transmissive to one of the transmit and receive laser beams and substantially reflective to the other of the transmit and receive laser beams. A tuning mechanism coupled to the etalon filter adjusts the wavelengths of peak transmittance of the etalon filter in accordance with which wavelength is to be transmitted and which wavelength is to be reflected, to direct the appropriate beams to and from the receiver and transmitter. For example, the etalon can be tilted or the air gap of the etalon can be adjusted to achieve different peak transmission wavelengths.

The transceiver further includes a position detector module that determines an angular direction of a remote transceiver from a detected laser beam, and a steering mirror disposed along the common optical axis, which controls an angle at which laser beams are directed to and from the telescope in accordance with feedback from the position detector module. The laser beam used to determine position can be a split-off portion of a receive laser beam modulated with data or a separate laser beam used exclusively for position detection having a different wavelength. For example, a separately transmitted beacon signal with a wider beamwidth can be used for this purpose.

Optionally, the transceiver can also include an RF transceiver that transmits and receives RF signals modulated with data. An optical/RF beamsplitter couples the transmit and receive RF signals between the common optical axis and the RF transceiver, and the same telescope used for optical transmission can be used to transmit and receive the RF signals. The RF signals can be used as a backup to the laser communication when optical performance is degraded due to excessive turbulence, cloud cover, fog, or other optical obscurations.

The various free-space optical components, including the telescope, beamsplitters, and steering mirror can be packaged in a free-space optics module housed in a rotatable turret mounted on the surface of a moving platform, such as an airborne, space, or ground vehicle. The data laser transmitter module, the optical receiver module, the position detector module, and the RF transceiver can all be located remotely within the moving platform (e.g., in the fuselage of an aircraft) and coupled to the turret via fiber optic cables (or a waveguide in the case of the RF transceiver). This arrangement makes the transceiver terminal more suitable to use in moving platforms, since only the components in the free-space optics module are exposed to the harsh environment of the turret, while the rest of the electronic and photonic equipment remains in a more controlled environment.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
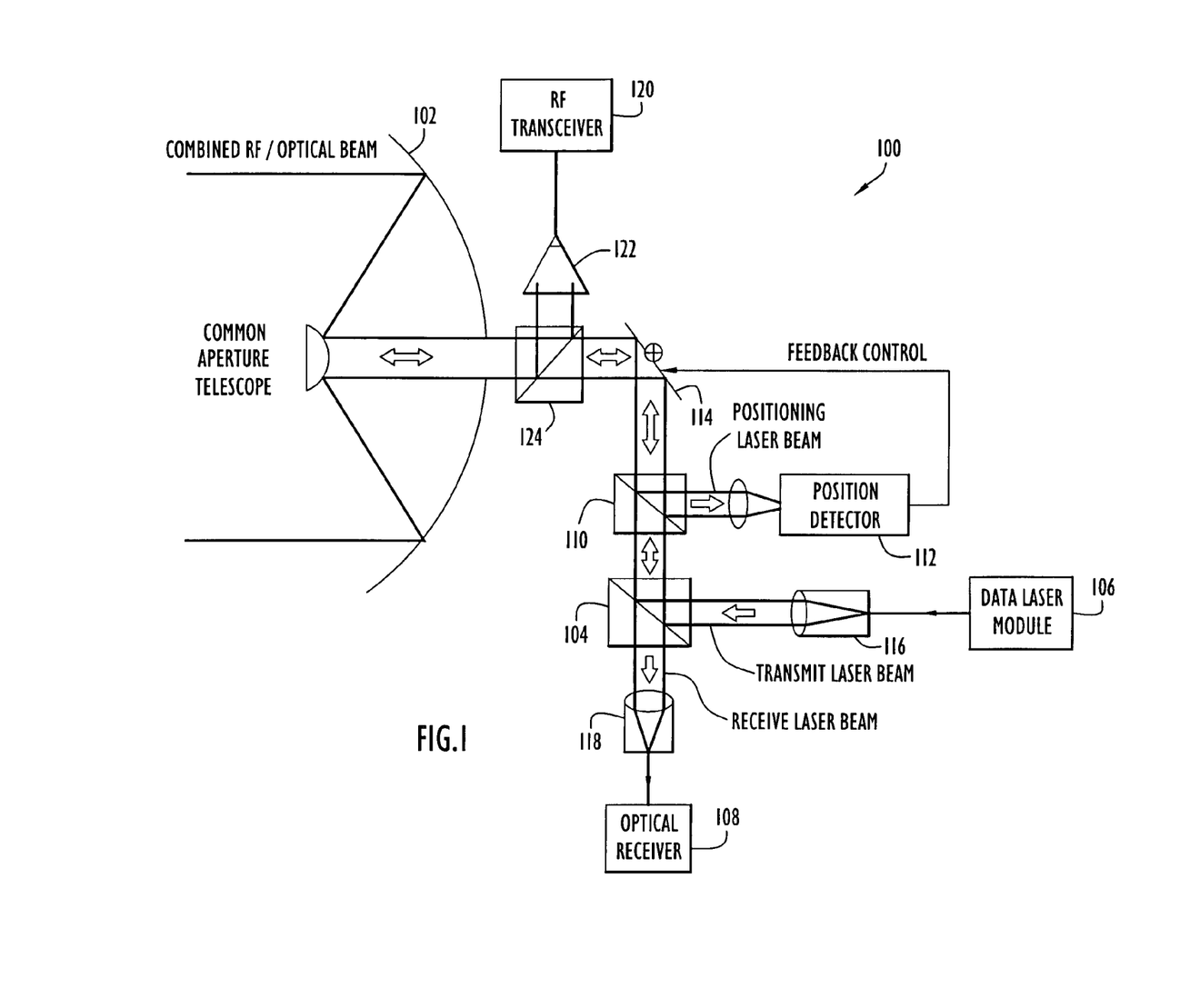
FIG. 1 is a diagram of a communication transceiver architecture in accordance with an exemplary embodiment of the present invention.

The following detailed explanations of FIGS. 1-6 and of the preferred embodiments reveal the methods and apparatus of the present invention. A free-space laser communication transceiver architecture according to an exemplary embodiment of the present invention is shown in FIG. 1. The architecture depicted in FIG. 1 is a conceptual diagram illustrating major functional units, and does not necessarily illustrate physical relationships.

Transceiver 100 includes a common aperture telescope 102 that transmits laser beams toward a far-end transceiver and receives laser beams from the far-end transceiver to effect two-way communication. Preferably, laser beams are transmitted at one wavelength and received at another wavelength such that telescope 102 can simultaneously transmit and receive laser beams. Additionally, telescope 102 can receive a laser beam used to determine the angular position of the far-end transceiver, which can be used to control the pointing direction of the transmit and receive laser beams. Optionally, this positioning laser beam can be a split-off portion of a receive laser beam modulated with data or, more preferably, a dedicated positioning laser beam having a third wavelength that differs from the transmit and receive wavelengths. In the latter case, the positioning laser beam can be, for example, a beacon laser beam having a wider beamwidth that is transmitted from the far-end transceiver terminal via a separate beacon aperture (i.e., not telescope 102). By way of a non-limiting example, telescope 102 can be a compact 10×afocal telescope having a four inch aperture, with a coated aluminum surface, and 1 to 0.7 diameter to length aspect ratio.

Within transceiver 10, laser beams travel to and from telescope 102 along a common optical axis as free-space collimated beams. Free-space optical components are disposed along the common optical axis to couple collimated beams into and out of the common optical axis. Specifically, a beamsplitter 104 directs collimated free space transmit beams originating from a data laser module 106 into the common optical axis and directs collimated free space receive laser beams from the common optical axis to an optical receiver module 108. A positioning beam beamsplitter 110, disposed between beamsplitter 104 and telescope 102, directs the positioning laser beam used for position detection from the common optical axis to a position detector 112. A fast steering mirror 114, disposed along the common optical axis between telescope 102 and beamsplitters 104 and 110, deflects incoming and outgoing laser beams at a selected angle to control the angle at which laser beams are transmitted and received by telescope 102. Feedback from position detector 112 is used to control the rotation angle of fast steering mirror 114 to achieve a deflection angle corresponding to the detected angle of the far-end transceiver.

Data laser transmitter module 106 generates transmit laser beams that are modulated with information signals (i.e., data) to be conveyed to the far-end transceiver. As will be described in greater detail, data laser transmitter module 106 is preferably wavelength-tunable and can be situated at remote location on the platform, with the transmit laser beams being supplied via a fiber optic cable to a free-space optics module containing the aforementioned optical components. A fiber optic collimator 116 converts the arriving transmit laser beam to a collimated beam, which is then supplied to beamsplitter 104. Another fiber optic collimator 118 converges the collimated free-space receive laser beam emerging from beamsplitter 104 into a fiber optic cable which supplies the receive laser beam to remotely located optical receiver 108, which is also preferably wavelength-tunable. Alternatively, the transmit collimator 116, can be positioned in the location of receiver collimator 118, with receiver collimator 118 positioned in the location of transmit collimator 116 by reconfiguration of the beamsplitter 104. Each of collimators 116 and 118 can be a gradient index lens fused to a fiber to form a single rigid assembly. For example, the collimators can be fused to a multimode fiber have a core diameter of, for example, 50, 62.5 or 100 microns. The multimode fiber significantly decreases system sensitivity to beam wander and scintillation cause by the atmosphere. Advantages over single mode fibers with a 10 micron diameter are increased energy coupled to the detector in the receiver and less signal fades over time. Similarly, the collimated positioning laser beam is converged by a focusing lens and focused onto position detector 112 which is preferably a quad cell detector. Feedback signals from the position detector can be supplied back to the fast steering mirror 114. Beamsplitter 104 is "switchable" or "tunable" to adjust its wavelength-dependent transmittance and reflectivity properties in accordance with the transmit and receive wavelengths, as described below in detail. In an alternative configuration, the beamsplitter 110 can be made to reflect both the data transmit and receive wavelengths and transmit the positioning laser beam. The operation of all the other components is still the same.

The configuration of transceiver results in the laser beams traveling as free-space collimated beams along a common optical axis between telescope 102 and beamsplitters 104 (or beamsplitter 110 in the case of the positioning laser beam). Only at the point at which the laser beams are sent to the receiver or detector or arrive from the transmitter are the beams converging or diverging. This arrangement makes it much simpler to split out optical components, significantly relaxes positioning and alignment tolerances, and makes the system much less susceptible to movement, vibration, and shock. The flexibility of this approach in terms of alignment, tolerances, and operation is significantly better than an arrangement in which, for example, a received beam is directly focused down onto a detector, where any movement at the position of the focus would be much greater than what results from a collimated beam.

Optionally, in addition to the laser communication capability, transceiver 100 includes an RF transceiver 120 which supplies and receives RF data signals to and from the system via an RF feedhorn 122. Specifically, an RF/optical beamsplitter 124 disposed along the common optical axis between fast steering mirror 114 and common aperture telescope 102 reflects RF signals emitted by RF feedhorn onto the common optical axis, such that the RF signals are transmitted via telescope 102. Similarly, RF signals received via telescope 102 are reflected from the common optical axis into RF feedhorn 122 and are received by RF transceiver 120. Optical wavelength laser beams traveling between telescope 102 and mirror 114 pass through beamsplitter 124. Thus both the RF data signals and optical-wavelength data laser beams propagate along the same optical axis to and from the telescope, and the telescope transmits and receives both the RF and optical signals.

RF communication can be used to supplement the laser communication in a number of ways. For example, atmospheric turbulence, clouds, fog, and other obscurations impact the optical wavelengths of lasers and can severely degrade or entirely preclude laser communication under certain circumstances. During such periods, RF communications can be used to maintain a communication link and continue transmission and reception of data, albeit at lower data rates than with clear-air laser communication. The RF data signals can also be used in an initial acquisition process to send GPS data to a far-end transceiver terminal to provide initial pointing information to the far-end terminal. Likewise, the RF data signals can be used to temporarily maintain a data link in the event the terminal temporarily loses track of the far-end terminal. Optionally, RF signals can be sent simultaneously with laser signals to supplement the overall data throughput or to provide an auxiliary channel.

Using the same telescope, RF transmissions have a much greater beam divergence than laser beam transmissions, producing a beamwidth on the order of several degrees rather than the microradian or milliradian beamwidth of a laser beam. With such a beamwidth, pointing and tracking operations do not need to be nearly as accurate as with laser beams. Note that the fast steering mirror in FIG. 1 does not control the direction of the RF beam. Nevertheless, when relying solely on RF communication for an extended period of time, some manner of position feedback and beam pointing control may be required. Such feedback can be provided via analysis of received RF signals, and steering can be effected by adjusting an angle of the RF feedhorn or by rotating the telescope via a gimbal. A drawback of the RF mode is that the data rate is limited to a fraction of a gigabit/second (Gbps) (e.g., on the order of 0.2 Gbps), whereas data throughput with the laser beams is on the order of several Gbps (e.g., 2 to 10 Gbps or more), or about a factor of ten greater throughput than RF. Thus, bandwidth is not as high with RF, but the link availability remains constant regardless of weather conditions.

The optical wavelengths used for transmitting and receiving the laser beams are preferably in the eye-safe region of the spectrum (i.e., wavelengths longer than about 1.4 microns), such as wavelengths in the telecommunications C and L bands or between about 1530 nm and 1600 nm. These wavelengths permit commercially-available optical components to be used in the laser transceiver. The wavelengths of the RF signals are preferably at the higher-frequency end of the RF spectrum, e.g., in the range of about 12 GHz to 94 GHz, to provide sufficient data bandwidth. Nevertheless, the invention is not limited to any particular range of optical wavelengths or RF wavelengths. Thus, as used herein and in the claims, the term "optical" refers generally to the range of wavelengths of electromagnetic signals within which "optical" equipment (e.g., optical communication equipment, transmitters, receivers, etc.) typically operates, including the visible spectrum, infrared wavelengths, and ultraviolet wavelengths. Likewise, the term "RF" refers to any wavelengths in the band of the spectrum conventionally designated as radio frequencies.

In accordance with another aspect of the present invention, the above-described transceiver terminals are capable of full-duplex communication operation in a free-space laser communication system. This capability is made possible by the use of the wavelength-tunable data laser transmitter, the wavelength-tunable optical receiver, and the switchable beamsplitter, which is capable of switching its transmission and reflection characteristics at the wavelengths employed by the transmitter and receiver. In one configuration or mode of operation, the optical receiver is tuned to receive a laser beam at a first wavelength $v_1$, the transmitter is tuned to generate a laser beam at a second wavelength $\lambda_2$, and the switchable beamsplitter is configured to direct receive laser beams of wavelength $\lambda_1$ toward the optical receiver and to direct transmit laser beams of wavelength $\lambda_2$ from the transmitter toward the telescope via the common optical axis. In another configuration or mode, the wavelengths are reversed such that the optical receiver is tuned to wavelength $\lambda_2$, the transmitter is tuned to wavelength $\lambda_1$, and the switchable beamsplitter is configured to direct receive laser beams of wavelength $\lambda_2$ toward the optical receiver and to direct transmit laser beams of wavelength $\lambda_1$ toward the telescope. This tuning and switching capability allows the transceiver to operate using two complimentary pairs of wavelengths, the first pair being: transmit $\lambda_1$, receive $\lambda_2$; and the second pair being: transmit $\lambda_2$, receive $\lambda_1$. Optionally, the data laser transmitter and the optical receiver are tunable to a number of wavelengths, such that more than two pairs of wavelengths can be used to transmit and receive laser beams.

Any of a variety of techniques can be used to achieve the tuning capability in the data laser transmitter and the optical receiver. For example, the data laser transmitter module can include a tunable Bragg laser capable of tuning over a narrow range of wavelengths covering sufficient spectrum to support the number of transmit/receive wavelengths pairs required for operation. The optical receiver can include a tunable optical filter, such as a tunable Fabry-Perot filter, capable of tuning over substantially the same wavelength band of the spectrum as the data laser transmitter. Optionally, a variable optical attenuator can be situated upstream of the tunable optical filter to control the signal level of the receive laser beam and prevent saturation of the filter. Preferably, the tunable optical filter has a fairly narrow receiver filter linewidth to reduce background radiation and other spurious signals in the received signal and essentially increase the signal-to-noise ratio of the receive laser beam supplied to a downstream amplifier prior to detection.

Figure 2:
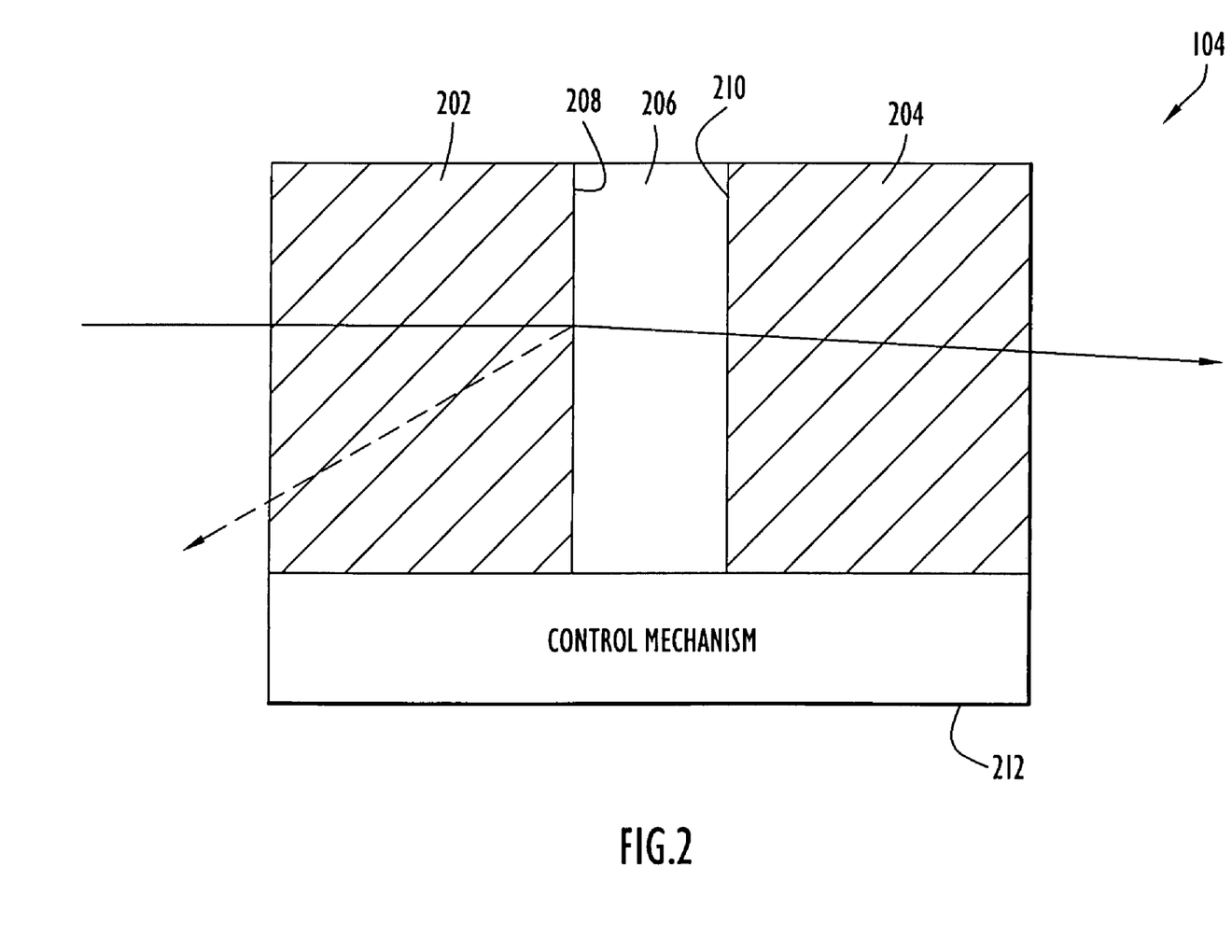
FIG. 2 is a diagram of an etalon configured to operate as a switchable beamsplitter in a free-space laser communication terminal according to an exemplary embodiment of the present invention.

Like the data laser transmitter and the optical receiver, the switchable beamsplitter is "tunable" to the selected wavelengths of the transmitter and receiver and, in particular, can essentially "switch" its transmission and reflection characteristics for two wavelengths used for two complimentary wavelength pairs. In accordance with an exemplary embodiment, the switchable beamsplitter includes an etalon filter having periodic transmission peaks over a range of wavelengths and a mechanism for adjusting the wavelengths of the periodic transmission peaks. A diagram illustrating the basic operation of an etalon filter which can serve as beamsplitter 104 is shown in FIG. 2. The etalon filter is essentially a bandpass filter that includes first and second optical filters 202 and 204 separated by an air gap 206. The width of air gap 206 can be, for example, on the order of tens or hundreds of nanometers. The planar surface 208 of filter 202 and the planar surface 210 of filter 204 face each other and bound the air gap. Optical coatings having certain transmittance and reflectivity properties are formed on surfaces 208 and 210. The interference between these coatings gives rise to a periodic transmittance profile or characteristic in which the etalon filter passes optical rays at certain periodic wavelengths. The exact values of the wavelengths of peak transmittance depend on a number of factors including the angle of incidence of an optical beam and the width of the air gap. FIG. 2 illustrates two cases for an incident optical beam. In one case, the incident beam has a wavelength corresponding to a transmittance wavelength peak of the etalon filter and is substantially transmitted through the etalon filter with only a slight change in angle at the boundary of the air gap. In the second case, the incident beam has a wavelength offset from a transmittance wavelength peak of the etalon filter and is substantially reflected at the boundary of the air gap, as indicated by the dashed line. It should be noted that the present invention is not limited to any particular etalon filter configuration, and etalon filters having more than one air gap and those constructed with various materials, coatings, and air gap spacings can be used as a beamsplitter in the free-space laser communication system of the present invention.

Referring again to FIG. 2, a control mechanism 212 is used to adjust the transmittance profile of the etalon filter. Any of a variety of known control mechanism can be used to accomplish the adjustment. For example, the transmittance profile can be shifted in wavelength by tilting the etalon filter with respect to the angle of incidence of the transmit laser beam and receive laser beam in the transceiver. A servo mechanism, a solenoid, a galvanometer, or any other mechanical or electrical device capable of imparting a slight rotation to the etalon filter can be used as the control mechanism. According to another option, the transmittance profile can be shifted by adjusting the air gap of the etalon filter using, for example piezoelectric element.

FIGS. 3A-3D illustrate an example of how shifting of the etalon filter transmittance profile can be used to interchange the wavelengths of the transmit and receive laser beams accepted by the etalon filter employed as a beamsplitter in the laser communication transceiver.

Figure 3A:
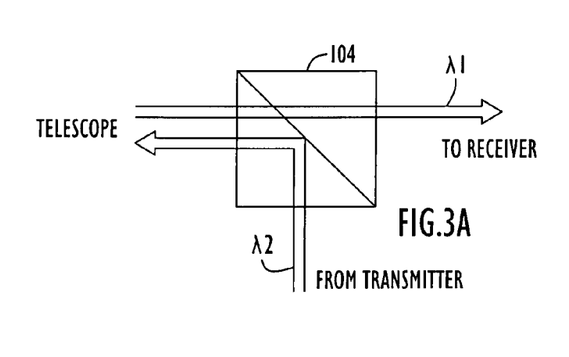
FIGS. 3A-3D illustrate the transmission characteristics of a switchable beamsplitter that permits two selected wavelengths to be switched between the transmitter and receiver according to an exemplary embodiment of the present invention.
Figure 3B:
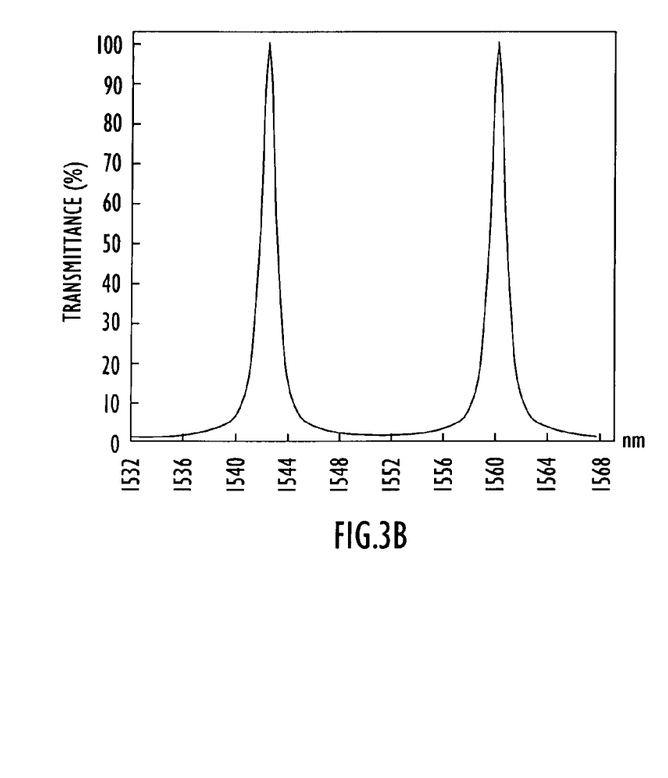

FIGS. 3A and 3B illustrate one mode of operation in which the optical receiver has been tuned to a wavelength of $\lambda_1$ and the data laser transmitter has been tuned such that transmit laser beam has a wavelength of $\lambda_2$. As shown in FIG. 3A, for proper operation, beamsplitter 104 is required to reflect the incident transmit laser beam onto the common optical axis toward the telescope and to transmit the receive laser beam arriving along the common optical axis toward the optical receiver. FIG. 3B is a plot of the transmittance profile of the etalon filter for a particular angle of incidence that corresponds to the operation in FIG. 3A. Specifically, the transmittance profile has a peak at a wavelength of about 1542 nm and has very low transmittance at wavelengths from about 1548 nm to about 1556 nm. Consequently, if the optical receiver is tuned to a first wavelength $\lambda_1$ of 1542 nm and if the laser transmitter is tuned to a second wavelength $\lambda_2$ of 1548 nm, the etalon beamsplitter will pass the receive laser beam and reflect the transmit laser beam as shown in FIG. 3A.

Figure 3C:
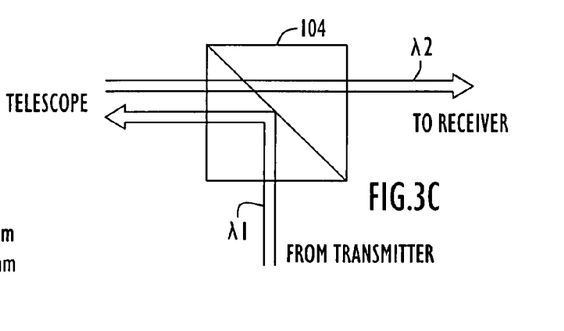
Figure 3D:
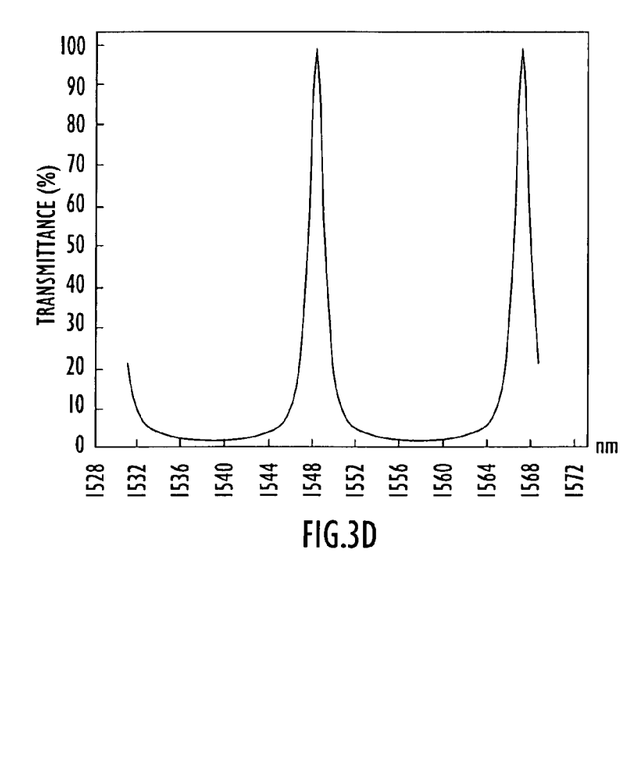

By slightly tilting the etalon filter by a few degrees to another position, the angles of incidence of the transmit and receive laser beams on the etalon filter change, resulting in the wavelength-shifted transmittance profile shown in FIG. 3D. As previously noted, such a shift could also be implemented by adjusting the etalon air gap. Note in the transmittance profile of FIG. 3D that the etalon filter is now highly reflective at the first wavelength $\lambda_1$ of 1542 nm and has a transmittance peak at the second wavelength $\lambda_2$ of 1548 nm, exactly the opposite of the scenario in FIG. 3B. This interchanging of the transmittance and reflectivity at these two wavelengths allows the transmitter and receiver operate properly with interchanged wavelengths $\lambda_1$ and $\lambda_2$. As shown in FIG. 3C, even though the transmitter has been re-tuned to generate a transmit laser beam with a wavelength $\lambda_1$, etalon beamsplitter 104 still properly reflects the transmit laser beam toward the telescope, because etalon beamsplitter has correspondingly been "switched" or "re-tuned" to now reflect wavelength $\lambda_1$. Likewise, while optical receiver has been re-tuned to wavelength $\lambda_2$, etalon beamsplitter has now been re-tuned to be transmissive at wavelength $\lambda_2$. The approximately 20 nm of separation between etalon transmittance peaks shown in FIGS. 3B and 3D is sufficient to provide a practical filter characteristic for a beamsplitter, yielding a wavelength separation between the transmit and receive laser beam wavelengths of several nanometers. Note that the positioning of the transmitter and receiver in FIGS. 3A and 3C is used for purposes of illustration and is arbitrary. The same principles would apply if the receiver were positioned along the reflective path and the transmitter along the transmissive path, and the invention is not limited to any particular orientation.

As will be appreciated from the foregoing, the etalon-based beamsplitter is capable of switching two wavelengths between transmission and reception. This capability permits the data laser transmitter and the optical receiver to be switched (tuned) interchangeably to the two wavelengths, thereby providing two pairs of transmit/receive wavelengths without having to reconfigure that physical location of the collimators that collimate the transmit laser beam into free space and converge the free-space receive laser beam into the optical fiber destined for the optical receiver. In other words, without this switching or tuning capability of the beamsplitter, it would be necessary to implement some sort of physical reconfiguration of components, such as moving the collimators to accept different beams or using multiple beamsplitters. In this design, the collimators remain stationary, thereby greatly simplifying the transceiver design. Note that additional switchable wavelength pairs can be obtained using wavelengths at other transmittance peaks; thus, two etalon positions can yield numerous transmit/receive wavelength pairs.

Note that a liquid crystal Fabry-Perot etalon could also be used in the beamsplitter of the present invention, since the transmittance and reflectance characteristics can be interchanged with such a device. However, this device has the disadvantage of working only with polarized light. If the laser beams are generated with random polarization (i.e., unpolarized light), the liquid crystal beamsplitter would cause half of the energy to be wasted. Thus, preferably, the laser beams are formed with randomly polarized light, and the beamsplitter is not polarization sensitive.

The two pairs of transmit/receive wavelengths resulting from interchanging the wavelengths $\lambda_1$ and $\lambda_2$ between the laser transmitter and optical receiver support full-duplex operation among a network of laser communication transceiver terminals, using only two different wavelengths, which is not possible with static transmit and receive wavelengths. The concept of full-duplex communication is well-known in the context of telecommunication modems, wherein two modems can simultaneously transmit and receive to each other using two different wavelengths. In any communication session between two modems, one modem is established as the sending modem and the other as the receiving modem in order to assign complementary transmit and receive wavelengths to the two modems (one modem will transmit on the first wavelength and receive on the second wavelength, and the other modem will have the converse convention). For modems to be able to communicate universally, every modem must be able to adopt the role of the sender or the role of the receiver, i.e., each modem must be able to interchangeably assign either wavelength to transmission or reception as necessitated by particular communication sessions.

Figure 4:
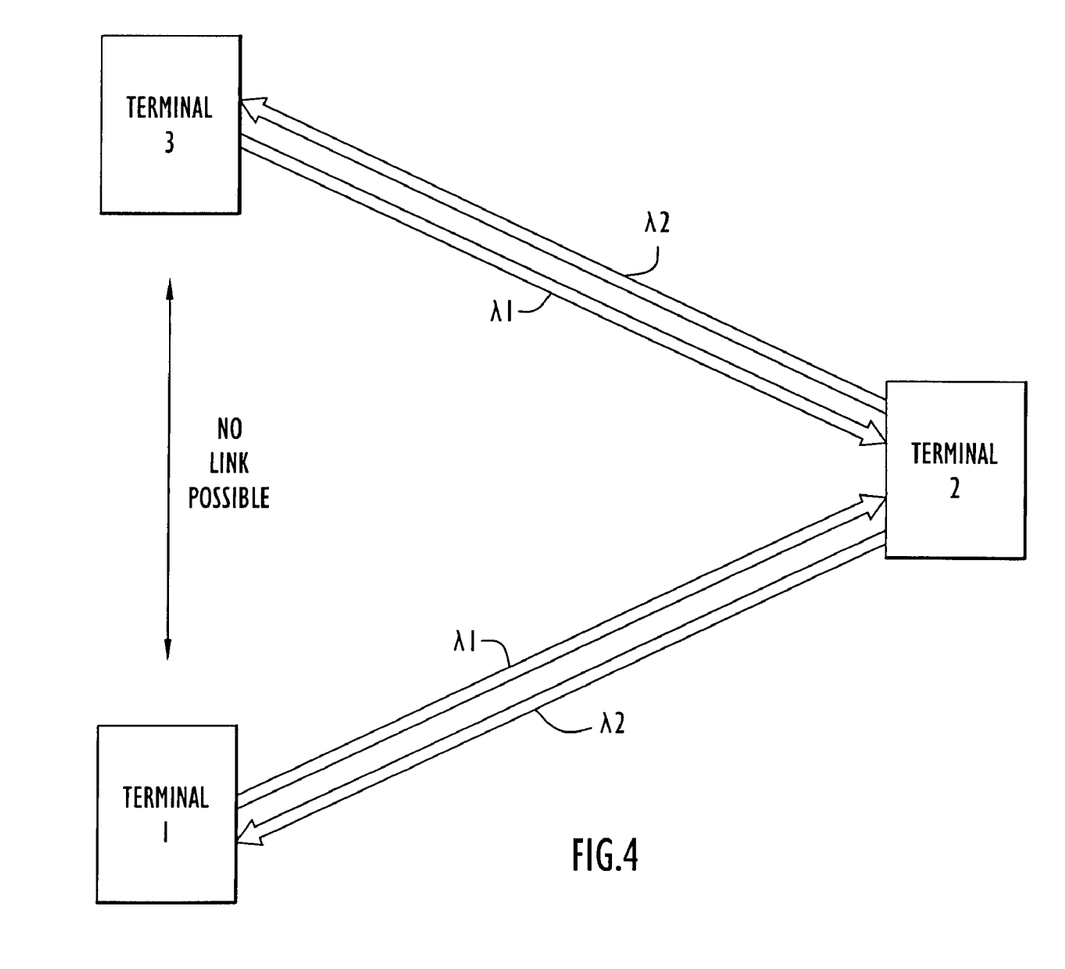
FIG. 4 depicts a communication scenario in which transceiver terminals of a laser communication system employ a fixed wavelength allocation and thereby cannot support full-duplex communication among multiple communication terminals.

The tunable data laser transmitter, the tunable optical receiver, and the switchable beamsplitter described in the exemplary embodiment permit the full-duplex concept employed in telecommunication modems to be adopted in the context of a free-space laser communication system by providing two switchable transmit/receive wavelength pairs. FIG. 4 illustrates a scenario in which three laser communication terminals employ a fixed wavelength allocation and thereby cannot support full-duplex communication among multiple communication terminals. Terminal 1 transmits at a first wavelength $\lambda_1$ and receives at a second wavelength $\lambda_2$, while terminal 2 receives at the first wavelength $\lambda_1$, and transmits at the second wavelength $\lambda_2$. Consequently, terminals 1 and 2 can communicate with each other. Likewise, terminal 3 transmits at the first wavelength $\lambda_1$, and receives at the second wavelength $\lambda_2$; thus, terminals 2 and 3 can also communicate with each other. However, terminals 1 and 3 cannot communicate with each other, because both of these terminals transmit at the first wavelength $\lambda_1$, and receive at the second wavelength $\lambda_2$; (i.e., the wavelengths are not complementary).

Figure 5:
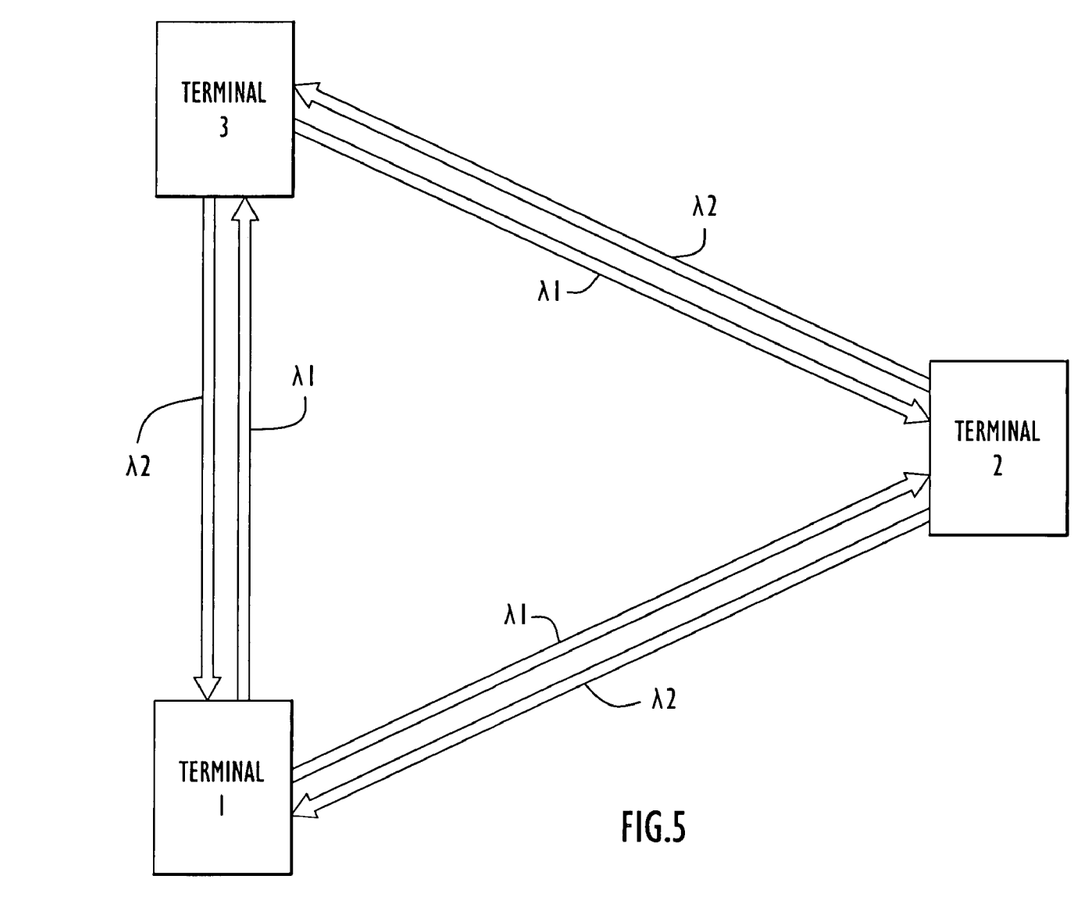
FIG. 5 depicts a communication scenario in which transceiver terminals of a laser communication system employ a dynamic wavelength allocation which supports full-duplex operation in accordance with an exemplary embodiment of the present invention.

FIG. 5 depicts a communication scenario in which transceiver terminals of a laser communication system employ a dynamic wavelength allocation which universally supports full-duplex operation in accordance with an exemplary embodiment of the present invention. In this scenario, terminals 1 and 3 can communicate with terminal 2 using the convention shown in FIG. 4. However, terminals 1 and 3 can also communicate with each other by switching the transmit/receive wavelengths of terminal 3, such that terminal 3 receives at the first wavelength $\lambda_1$, from terminal 1 and transmits at the second wavelength $\lambda_2$ to terminal 1. To complement this, terminal 1 receives at the second wavelength $\lambda_2$ from terminal 3 and transmits at the first wavelength $\lambda_1$ to terminal 3. This scheme can easily be extended when adding a fourth terminal or any number of additional terminals, since every terminal can adopt either transmit/receive wavelength pair.

Figure 6:
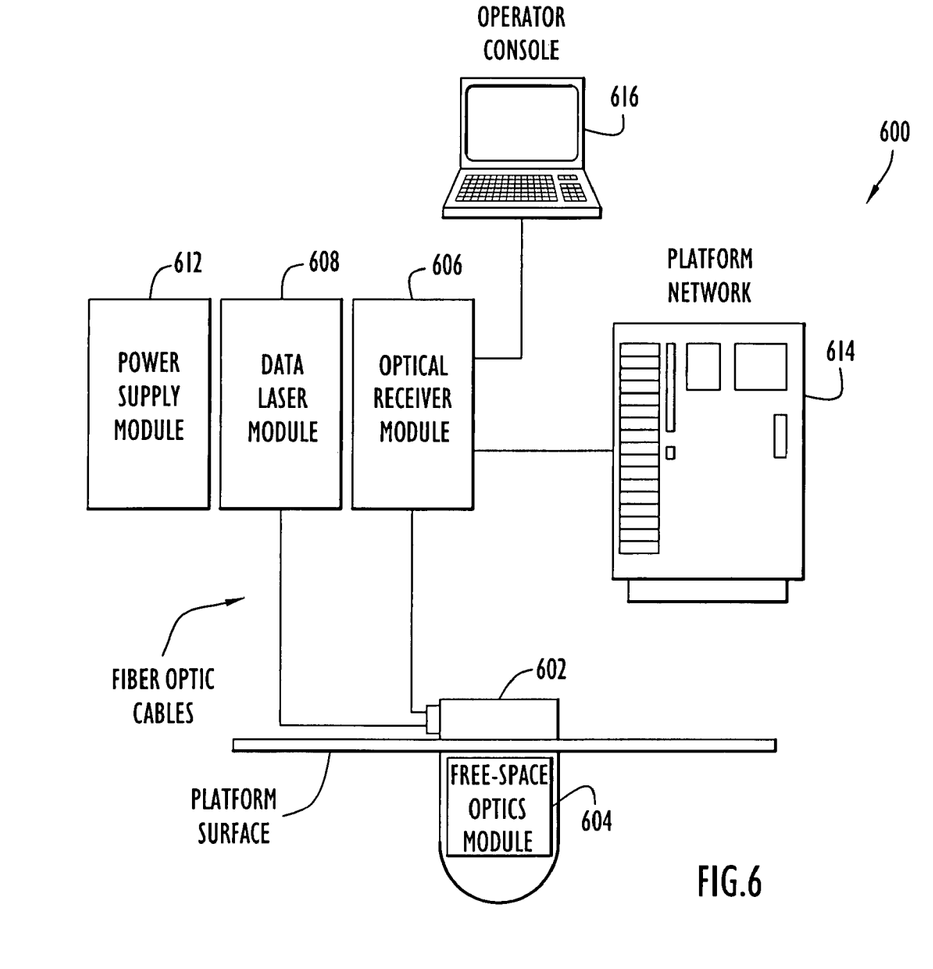
FIG. 6 is a diagram illustrating a system configuration of a communication transceiver terminal according to an exemplary embodiment of the present invention.

A practical configuration of a laser communication transceiver terminal 600 according to an exemplary embodiment of the present invention is illustrated in FIG. 6. Terminal 600 is mounted on a moving platform, such as an aircraft, a satellite, a ship or watercraft, and a ground vehicle. A turret 602 is mounted on the outer surface of the platform and includes a dome-like enclosure that protrudes from the outer surface to the exterior of platform. Turret 602 houses a free-space optics module 604 that contains the free-space optical components shown in FIG. 1. Pointing and tracking gimbals are used to rotate the turret (and hence the telescope) through all or nearly all of 360° in azimuth and through 180° in elevation angles (e.g., a 20° azimuth blind area may be located toward the rear of the aircraft where substantial air turbulence degrades performance). For initial acquisition and subsequent tracking, the gimbals can be used for coarse positioning of the telescope and pointing of the laser and RF beams, and the fast tuning mirror can be used for fine positioning of the laser beams. The coarse positioning provided by the gimbal may be sufficient for positioning the RF beam due to the wider beamwidth of the RF beam.

Referring again to FIG. 6, the optical receiver module 606, the data laser transmitter module 608, and a supporting power supply module 612 are located remotely within the platform. The modules can be linked to an operator console 616 and a platform network 614 for receiving and send data and monitoring operation of the system. In the case of an airborne platform, modules 606, 608, and 612 are preferably located in an internal pressured compartment (e.g., mounted on racks within the fuselage of the aircraft). In this manner, the components that generate and receive the modulated laser energy are not exposed to the harsh environment seen by the turret mounted outside the aircraft skin. This arrangement has the twofold advantage of relaxing the operating conditions on the most sensitive devices and minimizing the turret size that is externally exposed. Only system components that interface to the free space (i.e., optical telescopes) or the pointing and tracking are required within the turret envelope. If RF signals are also transmitted and received by the telescope, the RF transceiver can likewise be located remotely from the turret.

Fiber optic cables are used to couple the optical receiver module 606, data laser transmitter module 608, to turret 602. Slip ring connections in the turret can be used to provide laser and electrical signal coupling between the turret and free space optics module 604. The optional RF transceiver can be coupled to the turret via an RF waveguide or the like.

In an operational free space laser communication system, the transceiver communication terminals of the present invention preferably employ commercial fiber-optic standards in an open system, full duplex, protocol neutral, scheme operating at data rates of at least 2 gigabits per second. The data rate of the terminals can be reduced if atmospheric effects cause a significant increase in bit error rate. The terminals can operate between moving platforms or between a moving platform and a stationary platform (e.g., in an airborne context, in air-to-air and air-to-ground scenarios).

The system can be configured to accommodate different network interfaces. For example, the terminals can send and receive data over 10/100 and gigabit Ethernet interfaces when operated as a stand-alone link. The terminals can also be configured to serve as a third data path on a multi-purpose common data link (MP-CDL) on an aircraft along with wide and narrow beam RF links. Transmission of data over distances greater than 100 kilometers is feasible.

The transceiver terminals of the present invention can be used to transmit virtually any type of information or data including, but not limited to: sensor data, navigation signals, voice signals, image signals, video signals, data relating to an application running on a processor, control signals, and overhead or communication protocol signals (e.g., relating to the communication protocol, handshaking, routing, equipment configuration, etc.). In particular, sensors that collect information for intelligence, surveillance, and reconnaissance generate a substantial amount of data and can benefit from the high data rates employed in laser communications to transmit the information in a reasonable amount of time.

Aspects of the architecture described herein may be used in other related fields. For example, the remote configuration of the photonic and electronic equipment and the collimated free-space optics schemes may be useful in LADAR systems for position tracking and two and three dimensional imaging or in laser vibrometry to investigate properties of surfaces.

Having described preferred embodiments of new and improved communication transceiver architecture, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A free-space communication transceiver, comprising:
   a telescope configured to transmit and receive laser beams;
   a data laser transmitter module for generating a transmit laser beam modulated with data, the transmit laser beam having a transmit wavelength;
   an optical receiver module for processing a receive laser beam received from the telescope to recover data, the receive laser beam having a receive wavelength different from the transmit wavelength;
   a transmit/receive beamsplitter configured to direct the transmit laser beam from the data laser transmitter module to a common optical axis of the telescope and to direct the receive laser beam from the common optical axis to the optical receiver module such that the transmit and receive laser beams are collinear collimated free space beams along the common optical axis between the transmit/receive beamsplitter and the telescope;
   an RF transceiver configured to transmit and receive RF signals modulated with data; and
   an optical/RF beamsplitter configured to couple transmit and receive RF signals between the common optical axis and the RF transceiver, wherein the telescope is configured to transmit and receive RF signals.

2. The transceiver of claim 1, wherein the transmit/receive beamsplitter comprises:
   a tunable etalon filter coupled to the data laser transmitter module along a first optical axis and coupled to the optical receiver module along a second optical axis, such that the etalon filter is substantially transmissive to one of the transmit and receive laser beams and substantially reflective to the other of the transmit and receive laser beams; and
   a tuning mechanism coupled to the tunable etalon filter and configured to adjust wavelengths of peak transmittance of the etalon filter in accordance with the first and second modes.

3. The transceiver of claim 1, wherein the transmit and receive laser beams comprise randomly polarized light.

4. The transceiver of claim 1, further comprising:
   a position detector module configured to determine an angle of arrival of a positioning laser beam received by the telescope, the positioning laser beam having a third wavelength that is different from the transmit and receive wavelengths;
   a positioning beam beamsplitter configured to direct the positioning laser beam from the common optical axis to the position detector module; and
   a steering mirror disposed along the common optical axis and configured to control an angle at which beams are transmitted from and received by the telescope, wherein the steering mirror is adjusted in accordance with feedback from the position detector module.

5. The transceiver of claim 1, further comprising:
   a first fiber optic collimator for collimating transmit laser beams supplied to the transmit/receive beamsplitter; and
   a second fiber optic collimator for converging collimated receive laser beams exiting the transmit/receive beamsplitter.

6. The transceiver of claim 5, wherein each of the first and second collimators is a gradient index lens fused to a fiber to form a single rigid assembly.

7. The transceiver of claim 5, wherein each of the first and second collimators is a gradient index lens fused to a multimode fiber have a core diameter of between 50 and 100 microns.

8. The transceiver of claim 5, further comprising: a free-space optics module containing the telescope, the transmit/receive beamsplitter, and the first and second fiber optic collimators;
   a first fiber optic cable coupling the data laser transmitter module to the free-space optics module, wherein the data laser transmitter module is located remotely from the free-space optics module; and
   a second fiber optic cable coupling the optical receiver module to the free-space optics module, wherein the optical receiver module is located remotely from the free-space optics module.

9. A free-space communication transceiver, comprising:
   a telescope configured to transmit and receive both laser and RF beams;
   a data laser transmitter module for generating a transmit laser beam modulated with data;
   an optical receiver module for processing a receive laser beam received from the telescope to recover data;
   a beamsplitter-beam combiner for coupling transmit and receive laser beams to a common optical axis of the telescope;
   an RF transceiver configured to transmit and receive RF signals modulated with data; and
   an RF/optical beamsplitter for coupling RF beams to the common optical axis.

10. The transceiver of claim 9, wherein the laser and RF beams travel along the common optical axis as free-space beams.

11. The transceiver of claim 9, wherein the RF beams are transmitted and received to convey data when communication performance with the laser beams is degraded.

12. The transceiver of claim 9, wherein the transceiver communicates in a full-duplex mode with a remote transceiver by simultaneously transmitting and receiving laser beams.

13. The transceiver of claim 12, wherein the transmit and receive laser beams are at different wavelengths.

14. The transceiver of claim 9, further comprising:
a position detector module configured to determine an angular direction of a remote transceiver from a detected laser beam; and
a steering mirror disposed along the common optical axis and configured to control an angle at which laser beams are directed to and from the telescope without controlling an angle at which RF beams are directed from the telescope, wherein the steering mirror is adjusted in accordance with feedback from the position detector module.

15. The transceiver of claim 14, wherein the RF/optical beamsplitter is disposed between the telescope and the steering mirror.

16. The transceiver of claim 9, further comprising:
a free-space optics module containing the telescope, the laser beam coupler, and the RF/optical beamsplitter, wherein the data laser transmitter module, the optical receiver module, and the RF transceiver are located remotely from the free-space optics module;
first and second fiber optic cables respectively coupling the data laser transmitter module and the optical receiver module to the free-space optics module; and
a waveguide coupling the RF transceiver to the free-space optics module.

17. A laser communication terminal, comprising:
a turret mounted on an external surface of a moveable platform;
a free-space optics module housed in the turret, the free space optics module including: a telescope for transmitting and receiving laser beams that travel through at least a portion of the free-space optics module as collimated free-space laser beams along a common optical axis; a steering mirror disposed along the common optical axis for controlling an angle at which beams are transmitted from and received by the telescope; and a beamsplitter for coupling transmit and receive laser beams to the common optical axis;
a data laser transmitter module for generating a transmit laser beam modulated with data, the data laser transmitter module being located remotely from the turret and being coupled to the turret via a first fiber optic cable;
an optical receiver module for processing a receive laser beam received from the telescope to recover data, the receive laser beam being located remotely from the turret and being coupled to the turret via a second fiber optic cable;
an RF transceiver configured to transmit and receive RF signals modulated with data; and
an optical/RF beamsplitter configured to couple transmit and receive RF signals between the common optical axis and the RF transceiver, wherein the telescope is configured to transmit and receive RF signals.

18. The laser communication terminal of claim 17, further comprising:
a position detector module configured to determine an angle of arrival of a positioning laser beam received by the telescope, wherein the steering mirror is adjusted in accordance with feedback from the position detector module.

19. The laser communication terminal of claim 18, wherein the positioning laser beam is derived from a received laser beam modulated with data.

20. The laser communication terminal of claim 18, wherein the positioning laser beam is separate from received laser beams modulated with data.

21. The laser communication terminal of claim 17, wherein the RF transceiver is located remotely from the turret and is coupled to the turret via an RF waveguide.

22. The laser communication terminal of claim 17, wherein the platform is an aircraft.

23. The laser communication terminal of claim 17, wherein the platform is a satellite.

24. The laser communication terminal of claim 17, wherein the platform is a ship or watercraft.

25. The laser communication terminal of claim 17, wherein the platform is a ground vehicle.

26. The laser communication terminal of claim 17, wherein the turret rotates to effect coarse steering, and the steering mirror rotates to effect fine steering.

* * * * *